(12) United States Patent
Chehadeh et al.

(10) Patent No.: US 7,774,844 B1
(45) Date of Patent: Aug. 10, 2010

(54) INTRUSION DETECTION THROUGH STORAGE MONITORING

(75) Inventors: Mohamad Chehadeh, Watertown, MA (US); Quang Vu, Southborough, MA (US); Christopher Michael Spirito, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1124 days.

(21) Appl. No.: 10/112,342

(22) Filed: Mar. 28, 2002

(51) Int. Cl.
*G06F 11/00* (2006.01)
*G06F 12/14* (2006.01)
*G06F 12/16* (2006.01)
*G08B 23/00* (2006.01)

(52) U.S. Cl. .................. 726/23; 713/189; 713/193; 340/541

(58) Field of Classification Search ............ 726/1, 726/25, 2, 22, 23
See application file for complete search history.

(56) References Cited

U.S. PATENT DOCUMENTS

| | | | |
|---|---|---|---|
| 4,293,910 A * | 10/1981 | Flusche et al. .............. 711/157 |
| 6,647,400 B1 * | 11/2003 | Moran ......................... 707/205 |
| 7,216,345 B1 * | 5/2007 | Porter ......................... 718/100 |
| 7,461,140 B2 * | 12/2008 | Spry et al. .................. 709/220 |
| 7,519,996 B2 * | 4/2009 | Cain ........................... 726/23 |
| 7,523,281 B2 * | 4/2009 | Madathilparambil et al. ......................... 711/163 |
| 7,549,164 B2 * | 6/2009 | Cook et al. .................. 726/22 |
| 7,571,474 B2 * | 8/2009 | Ross et al. .................. 726/22 |
| 7,636,944 B2 * | 12/2009 | Raikar ......................... 726/22 |
| 2002/0046275 A1 * | 4/2002 | Crosbie et al. .............. 709/224 |
| 2004/0010545 A1 * | 1/2004 | Pandya ....................... 709/203 |
| 2005/0132212 A1 * | 6/2005 | Haswell ...................... 713/193 |
| 2006/0294578 A1 * | 12/2006 | Burke et al. ................. 726/2 |
| 2009/0235091 A1 * | 9/2009 | Kurn et al. .................. 713/193 |

\* cited by examiner

*Primary Examiner*—Farid Homayounmehr
(74) *Attorney, Agent, or Firm*—Ballard Spahr LLP

(57) ABSTRACT

In a computer system having one or more host computers in direct communication with a data storage array, an attribute retrieval engine in direct communication with the data storage array monitors disk structures of the data storage array and produces a change event indication if a disk structure changes. An analysis engine in communication with the attribute retrieval engine and a rule set database produces an intrusion indication in response to a change event indication if information received from the attribute retrieval engine describing changes in disk structure match a rule in the rule set database.

17 Claims, 5 Drawing Sheets

Configuration File Variables

| | | |
|---|---|---|
| DEVNAME | Storage Array Device Name | DEV00X |
| PDEVNAME | Physical Device Name | cXtXdXsX |
| FSYSTYPE | File System Type | ufs, xfs, vfs, ... |
| SYSTYPE | Host Operation System | sol8, tsol8, lin2, ... |
| RULESETS | A list of Rule Sets | 1,2,3-20,25, ... |

Configuration File Example

| | | | | |
|---|---|---|---|---|
| DEV001 | c4t31d0s2 | ufs | sol8 | 1,2,4-10 |
| DEV002 | c4t31d5s2 | ufs | tsol8 | 3,5,11-15 |
| DEV003 | c2t15d10s2 | vfs | lin2 | 1,4-20,32 |

Rule Set File Vaiables

| | | |
|---|---|---|
| RULENUM | Rule Number | XXXX |
| RULENAME | Rule Name | Root Kit 001 or File Name |
| SYSTYPES | Host OS | sol8, tsol8, lin2, .... |
| FILES | Files to Monitor | /path/file1, /path/file2, /p/f3 |
| THRESHOLD | Ruleset Satisfaction | # of files, time to search |

Rule Set File Example

```
<RULENUM>001
<RULENAME>Linux Root Kit</NAME>
<SYSTYPES>lin2</SYSTYPES>
<FILES>/usr/bin/chfn, /usr/bin/chsh, /bin/login, /bin/ls, /usr/bin/du, /
bin/netstat, /sbin/ifconfig, /etc/passwd, /bin/ps, /usr/bin/top</FILES>
<THRESHOLD>8,3600</THRESHOLD>
</RULENUM>
```

Baseline File Vaiables

| | | |
|---|---|---|
| INDEX | Index Number | Unique Integer |
| FILENAME | Full Path to File + Name | /path/file1 |
| INODE | Inode of the File | Integer |
| fileMap | SYMAPI_FS_FILE_INFO_T | Storage Array DS |
| queryTime | How Often to Query | Integer (seconds) |

Baseline File Example

```
001:/usr/bin/chfn:151427:xoxoxoxoxxox::60
002:/usr/bin/chsh:151428:xoxoxoxoxxox:60
003:/etc/passwd:52138:xoxoxoxoxoxxo:60
```

FIG. 4

INTRUSION DETECTION THROUGH STORAGE MONITORING

BACKGROUND OF THE INVENTION

1. Field of the Invention

The present invention relates generally to detecting computer system security breaches and, more specifically, to detecting such breaches in computer systems having data storage arrays.

2. Description of the Related Art

Computer systems, particularly those having access to external networks such as the Internet, are vulnerable to intrusion or attack by unauthorized individuals. Such persons may be involved in industrial espionage, seeking trade secrets and other information stored on the system, or may simply be seeking to vandalize the system. Businesses, governments and other organizations spend considerable sums to protect the data stored on their computer systems and prevent disruption of system operations. Sophisticated firewalls and other mechanisms for thwarting intruders or attackers outside an organization have been developed. Security mechanisms have also been developed for protecting data against unauthorized access by individuals inside an organization. Although such mechanisms provide the first line of defense against intrusions and attacks, there is also a need for mechanisms that detect such security breaches in the event an intruder is at least partially successful so that corrective actions can be taken as soon as possible.

Although computer systems typically have many elements, including mass data storage devices, host computers, back-end servers, administrative workstations, and various peripheral devices, intrusion detection solutions have focused upon host computers or servers. Conventional intrusion detection software operates on host computers and monitors file changes, evaluates whether changes in file structures indicate an attack based upon attack signatures and rule sets, and notifies system administrators or other personnel if data stored on network servers have been compromised. Various attack signatures and rule sets are known that are used to differentiate between expected types of changes and those that are likely to indicate an intrusion. For example, a password file can normally be expected to change from time to time, but a large number of changes occurring within a short time span may indicate an intruder has accessed the system. Similar intrusion detection software for network routers and switches has also been developed.

Host-based intrusion detection solutions are themselves potentially vulnerable to attack. Once an intruder gains access to a host, the intruder may be able to render them ineffective and thus escape detection. It would be desirable to provide an intrusion detection solution that is resistant to access by an intruder. The present invention addresses this problem and others in the manner described below.

SUMMARY OF THE INVENTION

The present invention relates to intrusion detection in a computer system having one or more host computers in direct communication with a data storage array. An attribute retrieval engine in direct communication with the data storage array and not directly connected to any of the host computers monitors disk structures of the data storage array and produces a change event indication if a disk structure changes. An analysis engine in communication with the attribute retrieval engine and having access to a rule set produces an intrusion indication in response to a change event indication if information received from the attribute retrieval engine describing changes in disk structure match a rule in the rule set. Rules for evaluating and distinguishing whether a change is to be expected or signifies potential intrusion are well-known, and the rule set can include any such rule known in the art. An example of such as rule is that if some predetermined threshold number of files changed within some predetermined threshold number of minutes, an alert should be issued to signal possible intrusion. The files to monitor can be specified by an operator in an input file.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 4 illustrates data files usable in the method illustrated in FIGS. 2-3.

DETAILED DESCRIPTION

Figure 1:
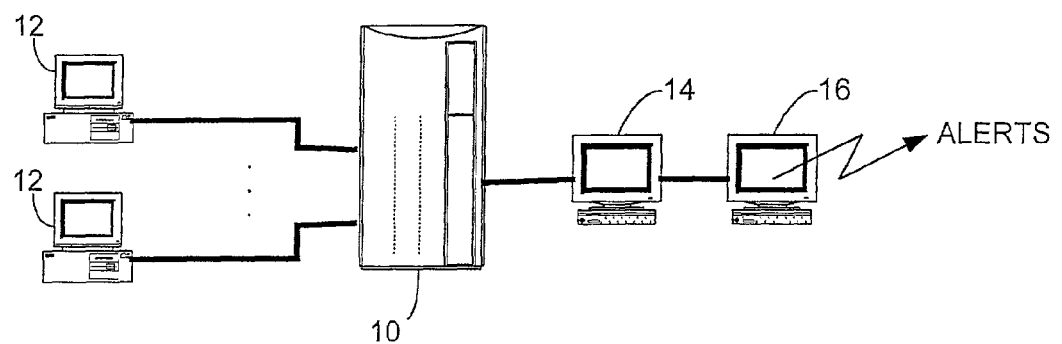
FIG. 1 illustrates a system in accordance with one embodiment of the present invention.

As illustrated in FIG. 1, a computer system includes a data storage system 10 that is in direct communication via a small computer systems interface (SCSI) bus or any other suitable data communication link or network, such as Fibre Channel, with one or more user workstations 12. Data storage system 10 can be any suitable mass storage platform known in the art, such as the SYMMETRIX line of products produced by EMC Corporation of Hopkinton, Mass. The SYMMETRIX is an enterprise data storage platform that includes the hardware and software necessary to serve the data storage needs of a business enterprise having one or more such hosts 12. The hardware includes an array of disk drives (not separately shown) that typically have a collective storage capacity on the order of a terabyte or more. Nevertheless, the invention can be used in an environment having any suitable type of mass data storage system of any capacity. The SYMMETRIX hardware further includes processors and memory. The memory includes cache memory, which is used for buffering all input and output data between the SYMMETRIX and workstations 12, program or control store memory for storing the software under which the processors operate, and other memory. The processors can perform sophisticated data storage management tasks under the control of suitable software stored within the SYMMETRIX program memory. Persons skilled in the art are familiar with the myriad software tools or facilities that are commercially available for such data storage systems 10 and creating new tools and facilities using an appropriate application program interface (API) suite, such as EMC's DELTAMARK for the SYMMETRIX.

To be less vulnerable to attack from intruders who could perhaps gain access to workstations 12, the intrusion detection system to which the present invention relates is not associated with workstations 12. Rather, it is embodied in one or more platforms separate from and distinct from workstations 12. For example, it can include an attribute retrieval engine 14 and an analysis engine 16 embodied in appropriate software and hardware of one or more other computing platforms. Although illustrated in FIG. 1 as embodied in two distinct platforms, engines 14 and 16 can alternatively be separate processes operating on a single platform or can even be further integrated with each other. The number, type and organization of such other platforms or processes is not material to the invention; the important aspect is that they are separate and distinct from all user workstations 12 as well as storage array 10 to insulate them against attack from an intruder who gains access to workstations 12.

Figure 2A:
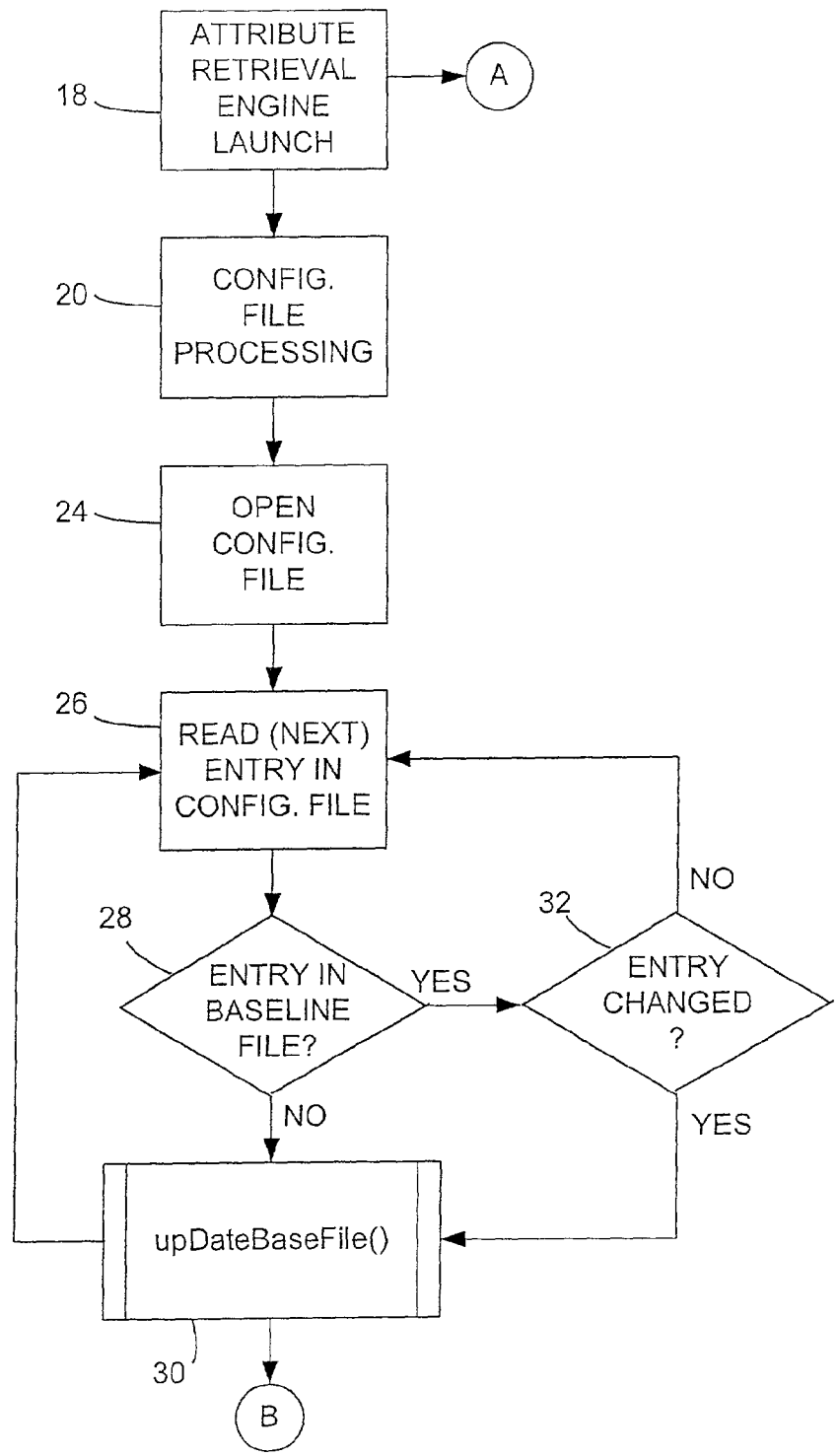
FIG. 2A is a flow diagram illustrating a method in accordance with an embodiment of the present invention.
Figure 2B:
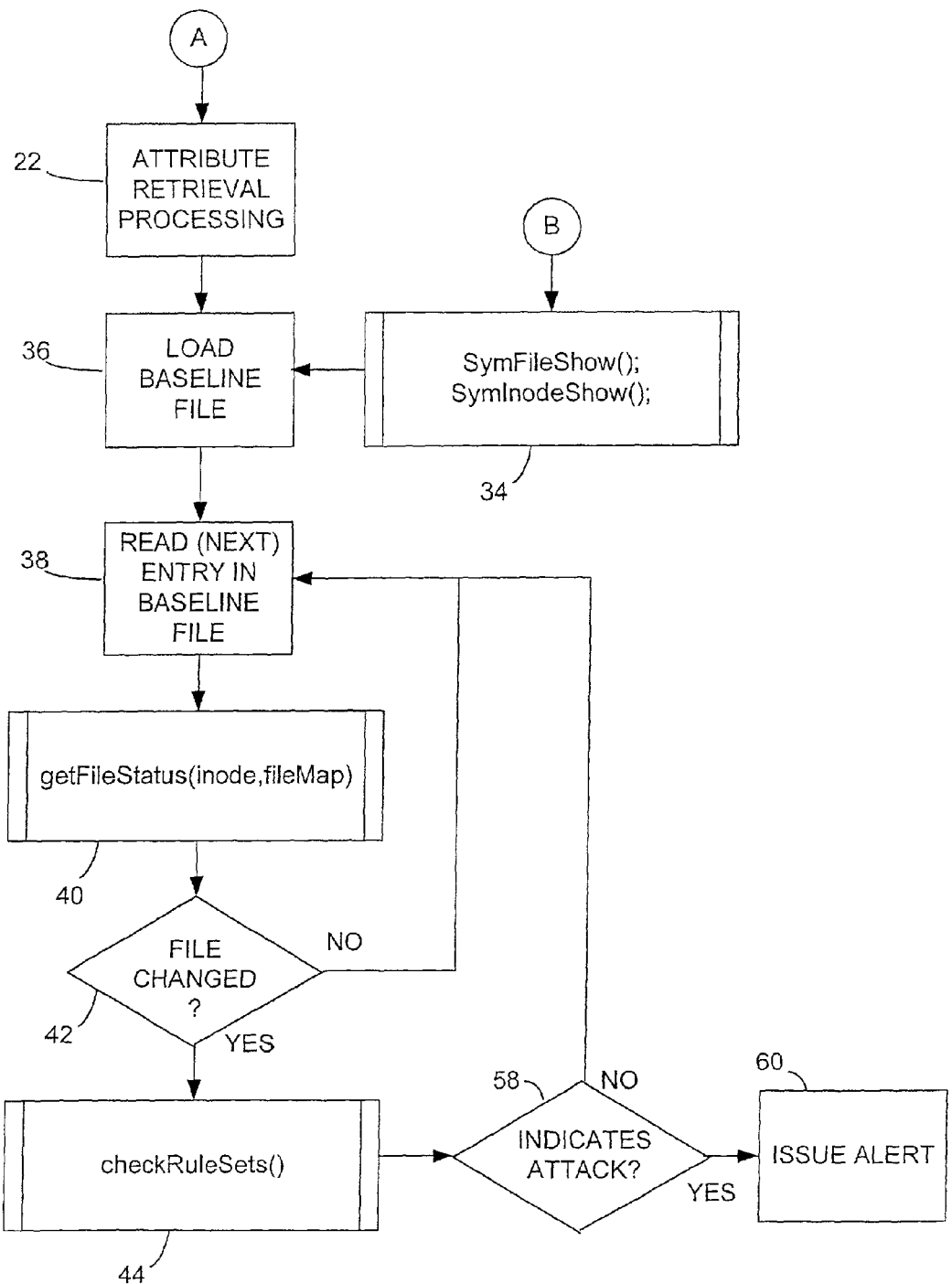
FIG. 2B is a continuation of the flow diagram of FIG. 2A.

The method by which the present invention operates in the illustrated embodiment of the invention is shown in FIGS. 2A-B. Persons skilled in the art to which the invention relates will readily be capable of programming or otherwise providing platforms with hardware and software embodying attribute retrieval engine 14 and analysis engine 16 (FIG. 1). At step 18 attribute retrieval engine 14 is started in some suitable manner, such as by the launching of one or more software process. One such process can process a configuration file at step 20 that contains information identifying the files and volumes in data storage system 10 to be monitored. Another process can begin querying data storage system 10 at step 22 as described in further detail below.

The information described below can be input to attribute retrieval engine 14 and analysis engine 16 in any suitable manner, such as via data files, examples of which are illustrated FIG. 4. For example, the configuration file can include a number of lines, each having five fields: storage array device name; physical device name; file system type, system type, and a comma-separated list of rule sets. The configuration file provides information that will be needed to query data storage system 10. The rule sets identify the files that are to be queried. For example, a rule denoted "1" may indicate a password file; a rule denoted "2" may indicate a log file; and rules "4"-"10" may indicate other types of files. As understood by persons skilled in the art to which the invention relates, it is these types of operating system files, e.g., password files, log files, etc., that are likely to be changed in some abnormal fashion by an intruder. For example, an intruder attempting to gain a password may access the password file an unusually large number of times within a short timespan. It is activities such as these that can be monitored and used as indicators of a possible intrusion.

The configuration file is opened at step 24, and at step 26 the first entry or line is read. A baseline file, an example of which is shown in FIG. 4, provides a reference point for comparison. That is, the baseline file reflects the most recent state of the disk structure at which time it was believed to have remained unchanged by the actions of any intruder. If at step 28 it is determined that the configuration file entry is not yet in the baseline file, then at step 30 a function "upDateBaseFile( )" is called, which adds the entry to the baseline file. If there are more entries in the baseline file, processing returns to step 26 at which the next entry is read. If at step 26 it is determined that the entry is already in the baseline file, then at step 32 it is determined whether the contents of that entry have changed. If the contents have changed, then at step 30 "upDateBaseFile( )" is called to replace the contents with that indicated in the configuration file. If the contents have not changed, processing returns to step 26 at which the next entry in the configuration file is read.

The baseline file identifies the files to query by their inodes. As well-understood by persons skilled in the art to which the invention relates, an inode is a data structure describing files in Unix and similar file systems. There is an inode for each file, and a file is uniquely identified by the file system on which it resides and its inode number on that system. Each inode typically contains at least the following information: the device where the inode resides, locking information, mode and type of file, the number of links to the file, the owner's user and group ids, the number of bytes in the file, access and modification times, the time the inode itself was last modified, and the addresses of the file's blocks on disk. The function "upDateBaseFile( )" calls two SYMMETRIX DELTAMARK API functions, as indicated by step 34: "SymFileShow( )" and "SymInodeShow( )" Data storage systems 10 other than the SYMMETRIX will have similar API calls or other means for obtaining such inode information. The "upDateBaseFile( )" function includes a loop in which it steps through the files listed in a rule set file, an example of which is illustrated in FIG. 4. For each file to monitor that is listed in the rule set file, "upDateBaseFile( )" calls "SymFileShow( )," which retrieves a pointer to the corresponding inode. The inode returned by "SymFileShow( )" is passed to "SymInodeShow( )" which retrieves the file map for that inode. The information from the file map, such as the pathname of the file and its inode, is then inserted into the baseline file.

As soon as the configuration file has been processed as described above, at step 36 attribute retrieval engine 14 loads the baseline file and starts to process requests for information by reading the baseline file entries at step 38 and putting each entry for a file to be queried into a queue at some suitable predetermined time interval, such as every few seconds. Each entry is processed at step 40 by calling a function "getFileStatus(inode,fileMap)." This function compares the file map in the baseline file with the file map as it exists at the time of the query. The function takes the inode as input and then calls "SymInodeShow( )" to retrieve the most recent file map. After comparison it returns an integer that indicates whether the file has changed. If it is determined at step 42 that it has not changed, processing returns to step 38 at which the next entry in the baseline file is processed. If the file has changed, then at step 44 the function "checkRuleSets( )" is called.

Figure 3:
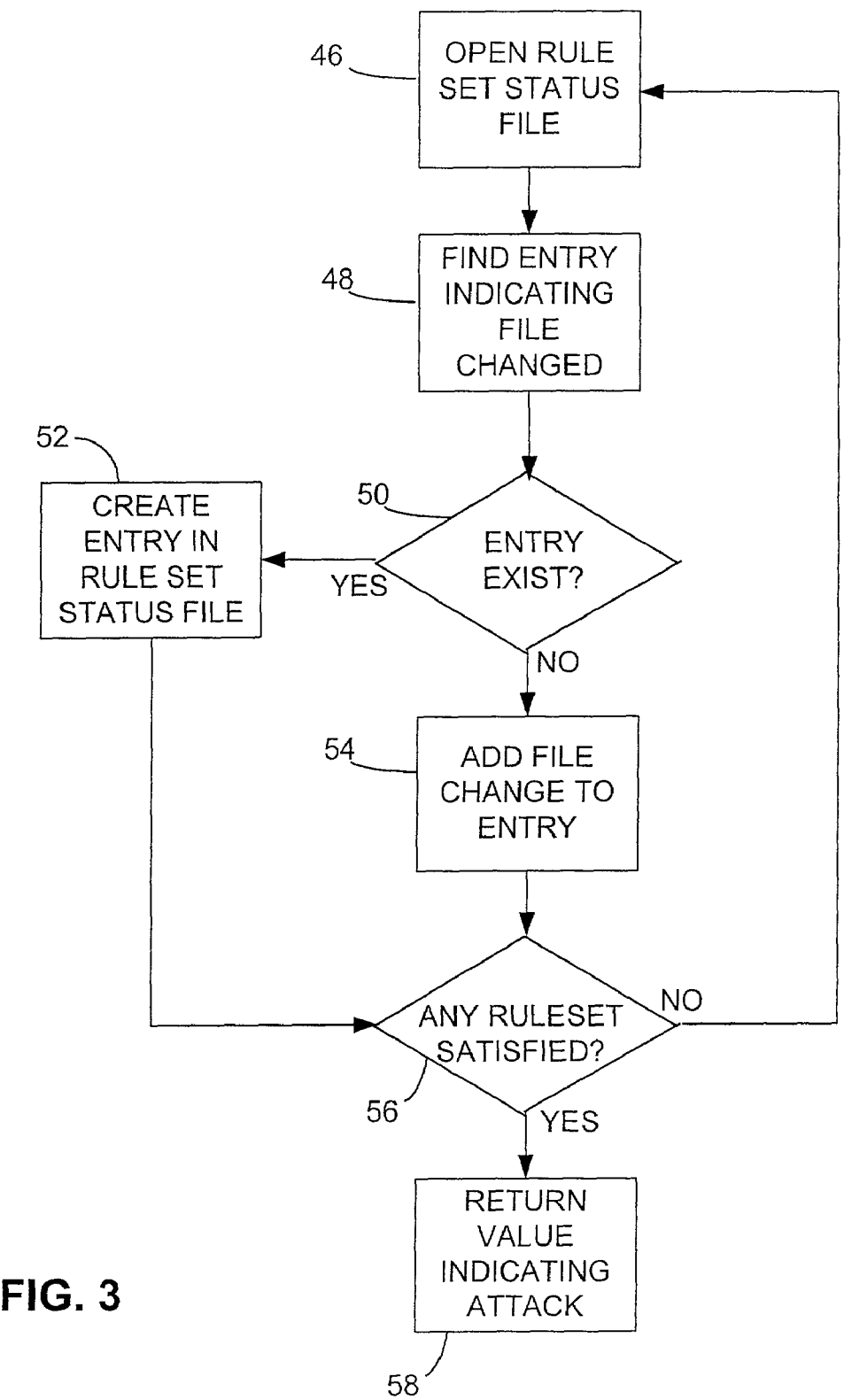
FIG. 3 illustrates in further detail a method step of checking rule sets.

The function "checkRuleSets( )" is illustrated in further detail in FIG. 3. Its purpose is to determine if any rule sets in a rule sets file or database have been either partially or fully satisfied and, if so, to issue an alert to a system administrator. At step 46 a rule set status file is opened. The rule set status file is a file that keeps track of which rule sets are currently being matched and for which volumes and associated systems. It lists the volumes in data storage system 10 that have had file changes detected by attribute retrieval engine 14 (FIG. 1). At step 48 the rule set status file is searched for any existing entries for the volume that had the file change. If an entry is found, at step 50 an additional entry is placed in the rule set status file at step 52 that reflects the recent file change as detected by attribute retrieval engine 14. If no entry is found at step 50, an initial entry is placed in the rule set status file at step 54 reflecting the file changes as detected by attribute retrieval engine 14.

At step 56 it is determined if a rule set has been satisfied. The "Threshold" variable from the rule sets file forms the basis for this determination. The first number in the rule sets file is an integer that indicates how many files need to have changed. The second number is the time interval within which these changes need to have occurred. For example, if the first number is "4" and the second is "3600," then the rule will be satisfied if at least four files listed in the rule sets file have changed within an interval of 3600 seconds (i.e., one hour). The function "checkRuleSets( )" then returns an integer indicating whether a rule has been satisfied. Referring again to FIG. 2, if it is determined at step 58 that a rule has been satisfied, an alert is issued at step 60. The alert appears on a system administrator's terminal or is recorded in a file or otherwise recorded so that the administrator or other personnel can investigate further to determine if an intrusion has in fact occurred and how any damage can be repaired.

As illustrated by the embodiment described above, the invention provides a storage-based solution to the problem of host-based intrusion detection solutions themselves being vulnerable to attack by an intruder. Unlike prior host-based solutions in which an intruder could potentially disable information collection, the storage-based solution of the present invention remains effective even if an intruder gains access to aspects of a host workstation.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for detecting intrusion in a computer system having one or more client computers and a data storage array, wherein the data storage array comprises a plurality of mass storage devices and wherein the one or more client computers communicate with the data storage array over a first network, the method comprising the steps of:
    loading a configuration file identifying one or more files to be monitored on a data storage array and a current state of respective one or more files;
    accessing a baseline file providing a most recent state of one or more files of the data storage array;
    determining that a most recent state of at least one of the one or more identified files to be monitored is not included in the baseline file;
creating an entry in the baseline file for the at least one of the one or more identified files;
determining that a most recent state of at least one of the one or more identified files to be monitored has changed;
replacing the most recent state of the at least one of the one or more identified files provided in the baseline file that has changed with the current state provided in the configuration file in association with the at least one of the one or more identified files;
monitoring, by a platform, disk structures of the data storage array through a connection to a local adapter of the data storage array in order to detect a change in one or more of the disk structures, wherein the platform is not connected to the one or more client computers, wherein monitoring comprises:
comparing a current state of each identified file to be monitored to the most recent state provided in the baseline file in association with the identified file;
producing a change event indication if the monitoring indicates that one or more of the identified files have changed; and
    producing an intrusion indication in response to a change event indication if it is determined that a rule in a rule set database has been satisfied, wherein a rule in the rule set database includes that more than a predetermined threshold number of files have changed within a predetermined threshold time interval.

2. The method claimed in claim 1, wherein the configuration file further identifies one or more volumes to be monitored on the data storage array and identified file types to be monitored on the volumes.

3. The method claimed in claim 2, wherein the baseline file further identifies a location on a volume at which each file of an identified file type is found.

4. The method claimed in claim 1, wherein another rule in the rule set database includes that more than a predetermined threshold number of files have changed.

5. The method claimed in claim 1, wherein another rule in the rule set database includes that files have changed within a predetermined threshold time interval.

6. The method of claim 1, wherein the local adapter comprises one of a SCSI adapter or a Fibre Channel adapter.

7. The method of claim 6, wherein the plurality of mass storage devices comprise hard disk drives.

8. The method of claim 7, wherein the first network comprises an IP network.

9. A system for detecting intrusion in a computer system, comprising:
    one or more client computers in communication with the data storage array through a first network, wherein the data storage array comprises a plurality of mass storage devices in a dedicated housing;
    an attribute retrieval engine in communication with the data storage array through a connection with a local adapter of the data storage array, wherein the attribute retrieval engine is not connected to the one or more client computers, the attribute retrieval engine configured to:
    load a configuration file identifying one or more files to be monitored on a data storage array and a current state of respective one or more files;
    access a baseline file providing a most recent state of one or more files of the data storage array;
    determine that a most recent state of at least one of the one or more identified files to be monitored is not included in the baseline file;
    create an entry in the baseline file for the at least one of the one or more identified files;
    determine that a most recent state of at least one of the one or more identified files to be monitored has changed;
    replace the most recent state of the at least one of the one or more identified files provided in the baseline file that has changed with the current state provided in the configuration file in association with the at least one of the one or more identified files;
    monitor disk structures of the data storage array in order to detect a change in one or more of the disk structures, wherein monitoring comprises:
    comparing a current state of each identified file to be monitored to the most recent state provided in the baseline file in association with the identified file; and
    produce a change event indication if one or more of the identified files has changed; and
        an analysis engine in communication with the attribute retrieval engine and a rule set database, the analysis engine producing an intrusion indication in response to a change event indication if it is determined that a rule in the rule set database has been satisfied, wherein a rule in the rule set database includes that more than a predetermined threshold number of files have changed within a predetermined threshold time interval.

10. The system claimed in claim 9, wherein the configuration file further identifies volumes to be monitored on the data storage array and identified file types to be monitored on the volumes.

11. The system claimed in claim 10, wherein the baseline file further identifies a location on a volume at which each file of an identified file type is found.

12. The system claimed in claim 9, wherein another rule in the rule set database includes that more than a predetermined threshold number of files have changed.

13. The system claimed in claim 9, wherein another rule in the rule set database includes that files have changed within a predetermined threshold time interval.

14. The system of claim 9, wherein the plurality of mass storage devices comprise hard disk drives.

15. The system of claim 14, wherein the local adapter comprises a SCSI adapter.

16. The system of claim 14, wherein the local adapter comprises a Fibre Channel adapter.

17. The system of claim 16, wherein the first network comprises an IP network.

\* \* \* \* \*